(12) United States Patent
Bunker

(10) Patent No.: US 8,818,642 B2
(45) Date of Patent: Aug. 26, 2014

(54) CONTROL OF ACTIVE VEHICLE DEVICES DURING CORNERING

(75) Inventor: Paul Bunker, Warwick (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 13/434,746

(22) Filed: Mar. 29, 2012

(65) Prior Publication Data

US 2013/0079996 A1   Mar. 28, 2013

(30) Foreign Application Priority Data

Mar. 29, 2011 (GB) .................................. 1105278.4

(51) Int. Cl.
*G06F 17/00* (2006.01)

(52) U.S. Cl.
USPC ................. 701/45; 701/36; 701/49; 701/71; 701/72

(58) Field of Classification Search
CPC ......... G06G 7/76; B60G 17/005; G06F 17/00
USPC ............................................... 701/72, 45, 46
See application file for complete search history.

(56) References Cited

U.S. PATENT DOCUMENTS

| | | | | |
|---|---|---|---|---|
| 4,621,833 A * | 11/1986 | Soltis | ........................... | 280/5.51 |
| 4,951,207 A * | 8/1990 | Furukawa et al. | ............... | 701/42 |
| 5,021,678 A * | 6/1991 | Diller | ........................... | 307/10.1 |
| 5,422,810 A * | 6/1995 | Brunning et al. | ............... | 701/41 |
| 5,890,082 A * | 3/1999 | Ikegaya et al. | ................... | 701/41 |
| 6,035,251 A * | 3/2000 | Hac et al. | ......................... | 701/70 |
| 6,301,536 B1 * | 10/2001 | Vaessen et al. | ................... | 701/45 |
| 6,719,088 B2 * | 4/2004 | Nakano et al. | ................. | 180/402 |
| 7,120,528 B2 * | 10/2006 | Salib et al. | ...................... | 701/45 |
| 7,369,927 B2 * | 5/2008 | Hille et al. | ....................... | 701/38 |
| 7,484,585 B2 * | 2/2009 | Takemura | ..................... | 180/268 |
| 7,502,675 B2 * | 3/2009 | Hac et al. | ......................... | 701/38 |
| 7,680,577 B2 * | 3/2010 | Mori | ............................... | 701/70 |
| 7,996,132 B2 * | 8/2011 | Park | ............................... | 701/46 |
| 2004/0024504 A1 * | 2/2004 | Salib et al. | ...................... | 701/38 |
| 2004/0024505 A1 * | 2/2004 | Salib et al. | ...................... | 701/38 |
| 2004/0186649 A1 | 9/2004 | Ono et al. | | |
| 2005/0060082 A1 * | 3/2005 | Heuer et al. | .................... | 701/70 |
| 2005/0222727 A1 | 10/2005 | Hille et al. | | |
| 2006/0041365 A1 | 2/2006 | Mori | | |

OTHER PUBLICATIONS

UK Search Report for GB1105278.4, dated Aug. 16, 2011, 1 page.

* cited by examiner

*Primary Examiner* — Helal A Algahaim
*Assistant Examiner* — Genna Mott
(74) *Attorney, Agent, or Firm* — Reising Ethington P.C.

(57) ABSTRACT

A method of triggering an active device of a vehicle at a pre-determined threshold comprises generating a steering wheel signal from steering angle rate of change of steering angle of the vehicle, the signal representing an advance in time in comparison to the steering wheel position and/or speed, and determining a conditioned vehicle lateral acceleration in dependence on the steering wheel signal and a measured vehicle lateral acceleration, the conditioned vehicle lateral acceleration being advanced in time in comparison with the measured vehicle lateral acceleration. An active device of the vehicle is triggered if the conditioned vehicle lateral acceleration exceeds a threshold lateral acceleration.

13 Claims, 2 Drawing Sheets

CONTROL OF ACTIVE VEHICLE DEVICES DURING CORNERING

FIELD OF THE INVENTION

The present invention relates to control of active devices of a vehicle in response to lateral acceleration(s) of said vehicle, in particular in conditions of high cornering force(s). Aspects of the invention relate to a method, to a system and to a vehicle.

BACKGROUND

It is known to control active devices of a vehicle according to a certain detected threshold. Such active devices may comprise for example occupant restraints, and deployable aerodynamic devices such as spoilers and aerofoils.

The threshold may be determined by, for example proximity to an obstacle, or simply in response to reaching a predetermined vehicle speed. An aerofoil may for example be deployed to enhance vehicle performance.

There may however be an inevitable delay in vehicle response as the measured parameter increases in value toward the threshold, and it would be desirable to provide compensation whereby this delay is eliminated or at least ameliorated during certain conditions of use of the vehicle.

In particular, the lateral acceleration of a vehicle typically peaks just prior to a vehicle exiting a corner, thus causing an inherent delay in actuation or deployment of an active device of the vehicle in response to high cornering forces, where the device is triggered at a threshold.

The active device may be a motorized seat belt. During vehicle cornering, a vehicle occupant is generally moving before the active device is deployed, and is typically arrested abruptly by a locked or retracting seat belt. This solution is thus not optimised for occupant comfort, and may be irritating if the threshold is set too low because the active device(s) will be repeatedly deployed. On the other hand a high threshold permits greater movement of an occupant before deployment, and a correspondingly higher contact load as the restraint has effect.

In the case of an aerodynamic device, the earlier and faster the deployment, the more effective will be the action of the device on the vehicle.

SUMMARY OF THE INVENTION

What is required is an early indication of the category of a cornering event so that activation of such active device(s) can occur with sufficient time for the active device to deploy in a timely manner, and have a more acceptable effect on the vehicle and/or the vehicle occupants. The term 'category' is intended to mean, for example, the severity of the increasing effect of a corner on the vehicle and occupants. Thus a large radius corner may have a low category, and a small radius corner may have a high category for a given vehicle speed.

It is an aim of the present invention to address this issue. Other aims and advantages of the invention will become apparent from the following description, claims and drawings.

Aspects of the invention therefore provide a method, a system and a vehicle as claimed in the appended claims.

According to one aspect of the invention for which protection is sought, there is provided a method of triggering an active device of a vehicle at a pre-determined threshold, and comprising the steps of:

determining steering wheel angle;
determining rate of change of steering wheel angle;
determining a steering signal from said angle and said rate of change, said signal representing an advance in time;
determining vehicle lateral acceleration;
determining a conditioned vehicle lateral acceleration by reference to said steering signal, said conditioned vehicle lateral acceleration being advanced in time;
applying a threshold lateral acceleration; and
triggering an active device of the vehicle if said threshold lateral acceleration is exceeded by said conditioned vehicle lateral acceleration.

Thus the present invention advances the time of activation of an active device by responding to driver demand, rather than reacting to the response of the vehicle to that driver demand. The term driver demand in this context may be defined as an input to the vehicle, made by the driver via the vehicle controls. The method is applied repeatedly or may be triggered by a pre-determined change of steering angle.

The steering signal may comprise a unitary value, or may comprise modified signals of steering angle and rate of change of steering angle, for example rotation or angular speed of the steering wheel away from the straight ahead condition. The steering signal is determined by applying a suitable algorithm to the inputs of steering angle and rate of change of steering angle, or may alternatively be determined by reference to a look-up table in which empirically derived values are stored by reference to individual vehicle or vehicle model.

In a preferred embodiment, the method may cease or block deployment of an active device if the steering angle is moving toward the centre (straight ahead) position.

The particular method and means which are selected for determining the steering signal(s) depend upon the vehicle or vehicle model in question, and will be selected by the skilled man using appropriate knowledge and judgement. This invention is particularly concerned with applying steering angle (e.g., departure from the straight ahead condition), and rate of change of steering angle to give a conditioned lateral acceleration, to which one or more thresholds may be applied.

Typically the threshold(s) may be used to deploy a resettable device such as an aerofoil to increase down force on the vehicle body, and/or to increase seat belt tension and/or to deploy an active seat belt tensioner to tension a seat belt with increased speed, and/or to deploy an active seat bolster to vary the seat bolster position and/or seat bolster stiffness.

Steering angle may be measured by any suitable sensor, for example a steering wheel angle sensor. The output from such a sensor may be represented by an electronic signal of a CAN-bus system, or the like. Rate of change of steering angle, or steering wheel speed, can be determined in a suitable electronic control unit (ECU) by reference to a clock signal.

In one embodiment the method includes the further steps of:

measuring vehicle speed, and in consequence determining a gain to be applied to the measurement of vehicle lateral acceleration; thereby giving a modified vehicle lateral acceleration;

and applying said modified vehicle lateral acceleration to determine said conditioned vehicle lateral acceleration.

In each case the lateral acceleration, or conditioned lateral acceleration or modified lateral acceleration may be represented by a signal or value suitable for direct comparison with the threshold.

In this way the conditioned vehicle lateral acceleration takes account of vehicle speed, and allows the category of a corner to be selected with reference to increasing vehicle speed, thus more closely approaching a desirable control characteristic of the vehicle. Thus a larger radius corner at high speed may indicate the same category as a small radius corner at a lower speed. A large radius corner at low speed will however indicate a quite different category from a small radius corner taken at high speed.

In this specification an active device is a resettable device, typically actuated by an electric motor, which changes condition in response to a change in vehicle state. Examples of active devices are active seat bolsters, active seat belt tensioners, and aerodynamic devices intended to enhance vehicle performance. Hydraulic, pneumatic and other kinds of actuator are also possible.

In an embodiment, the method includes the step of applying a minimum level to one or more of said steering angle, rate of change of steering angle, vehicle speed and lateral acceleration, below which an instance of the method is terminated.

Thus the method can be tuned to eliminate undesirable deployment of one or more active devices which may arise due to steering wheel vibrations, steering kickback due to road imperfections or driver inputs intended to compensate for minor road imperfections.

In a further alternative, the method may incorporate a dead zone for changes of steering angle within a small deviation from a reference point, such as the straight ahead condition.

In an embodiment successive thresholds may be applied to allow the speed and/or rate of deployment of the active device(s) to be varied. Typically the higher the category of corner, the faster the deployment. The same measures may be applied to allow the speed and/or rate of release to be varied.

The invention disclosed herein is typically realised in an electronic control unit (ECU) of a vehicle using signals transmitted via a CAN-bus network, or equivalent.

In the case of steer-by-wire systems, change of steering angle, and rate of change of steering angle may be indicated by reference to a request for change generated in a suitable interface between steering wheel and steering road wheels.

Within the scope of this application it is envisaged that the various aspects, embodiments, examples, features and alternatives set out in the preceding paragraphs, in the claims and/or in the following description and drawings may be taken independently or in any combination thereof.

BRIEF DESCRIPTION OF THE DRAWINGS

The present invention will now be described, by way of example only, with reference to the accompanying drawings in which.

DETAILED DESCRIPTION OF THE ILLUSTRATED EMBODIMENTS

Figure 1:
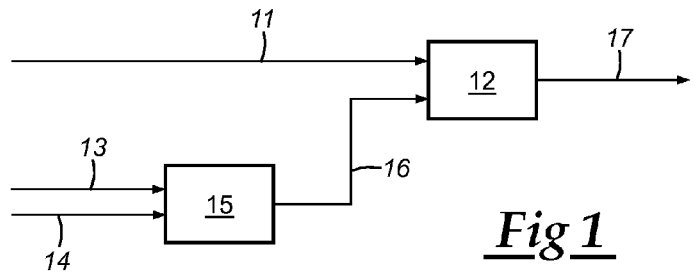
FIG. 1 is a block diagram of a first embodiment of the invention.

With reference to FIG. 1, an electronic signal representative of lateral acceleration of a vehicle is provided as an input (11) to a first calculation module (12). The input (11) can be provided by one or more sensors, such as accelerometers mounted on the vehicle.

In addition electronic signals representative of steering wheel position (13) and steering wheel speed (14) are provided to a second calculation module (15). The term 'steering wheel speed' is intended to mean the angular speed of the steering wheel in response to a driver input. The signals (13, 14) are typically generated from an angular position sensor or rotary encoder and a clock signal of any conventional kind.

Speed of steering wheel movement (14) is an indication of the category of a cornering event and can be used with the steering wheel angle (13) to 'boost' an output signal (16) so as to give a steering signal which is advanced in time. In comparison, a signal based merely upon lateral acceleration of the vehicle will lag driver input.

The signals (11) and (16) are combined in the module (12) to provide a modified characteristic (17) of vehicle lateral acceleration, which provides an early indication of likely vehicle movement in response to an input made by the driver, and can accordingly be used to actuate or deploy vehicle mounted active devices.

Figure 2:
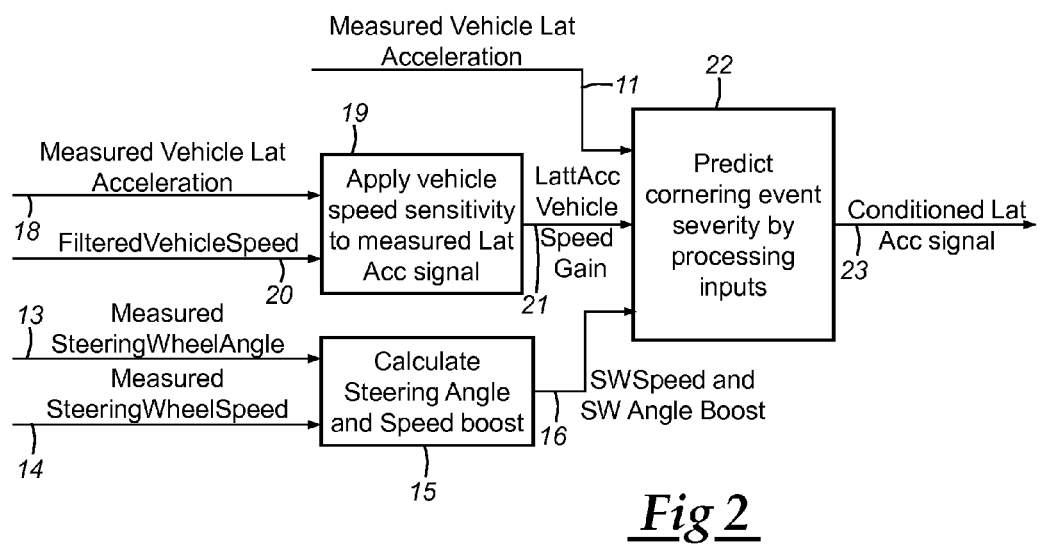
FIG. 2 is a block diagram of a second embodiment of the invention.

FIG. 2 illustrates a second embodiment whereby vehicle lateral acceleration is also provided as an input (18) to a third calculation module (19) where it is combined with a signal (20) representative of vehicle speed to give a modified output (21) whereby a gain is applied to the measured lateral acceleration, boosting this measured value to indicate an increased category associated with increased vehicle speed.

The output (21) is combined with signals (11) and (16) in a fourth calculation module (22) to further condition the modified lateral acceleration characteristic (23) and predict the cornering event severity.

Figure 3:
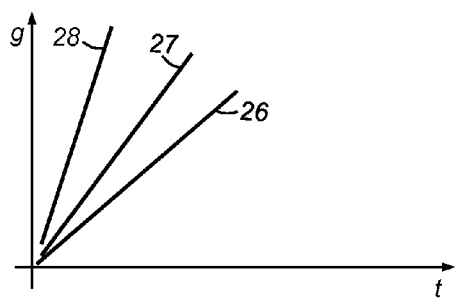
FIG. 3 is a simple diagram illustrating boosting of a lateral acceleration signal.

FIG. 3 illustrates in general terms the effect of embodiments of the invention, by plotting lateral acceleration (g) against time. Characteristic (26) is indicative of measured vehicle lateral acceleration. Characteristic (27) is indicative of vehicle lateral acceleration as conditioned by steering wheel inputs of angle and speed (inputs 13 and 14), and thus advanced in time. Characteristic (28) is indicative of further conditioning according to vehicle speed (input 20), and thus further advanced in time. The gain applied according to steering wheel speed and angle, and vehicle speed may be applied in the alternative order to achieve a similar result.

Figure 4:
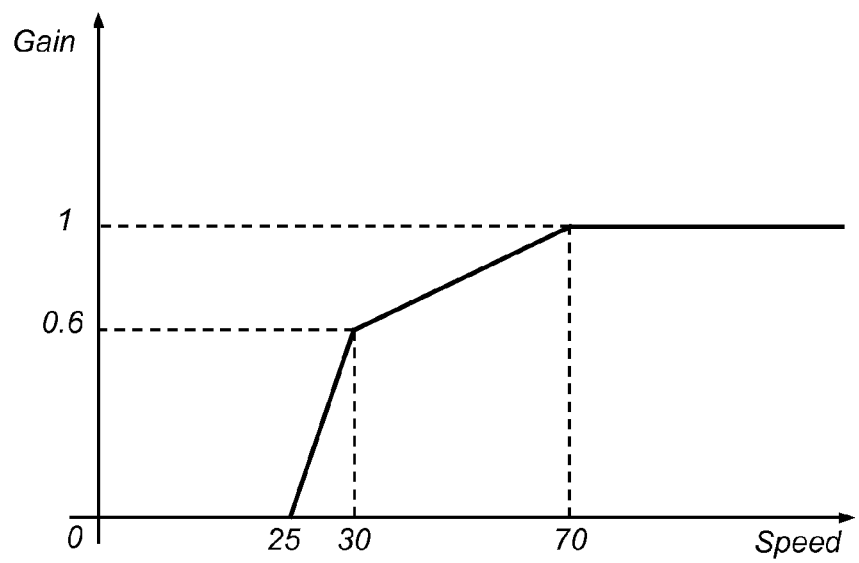
FIG. 4 shows graphically a gain map for an active device.

FIG. 4 illustrates one example of a practical application of gain (boost) to a deployable aerodynamic device by reference to vehicle speed. In the example zero gain is applied below 25 mph, because conditions do not require deployment of an active device. From 25 mph to 30 mph gain is applied progressively to a value of 0.6. From 30 mph to 70 mph gain is applied progressively at a different rate, to a maximum of 1.0. Above 70 mph active devices are deployed, and no further gain is necessary.

The required gain map may depend upon the vehicle in question, and will be selected by the skilled person according to the vehicle and requirements in use. A different gain map may be applied to different active devices, and accordingly the vehicle speed at which deployment occurs may vary. The upper speed threshold at which gain is no longer applied may also be selected as desired.

Figure 5:
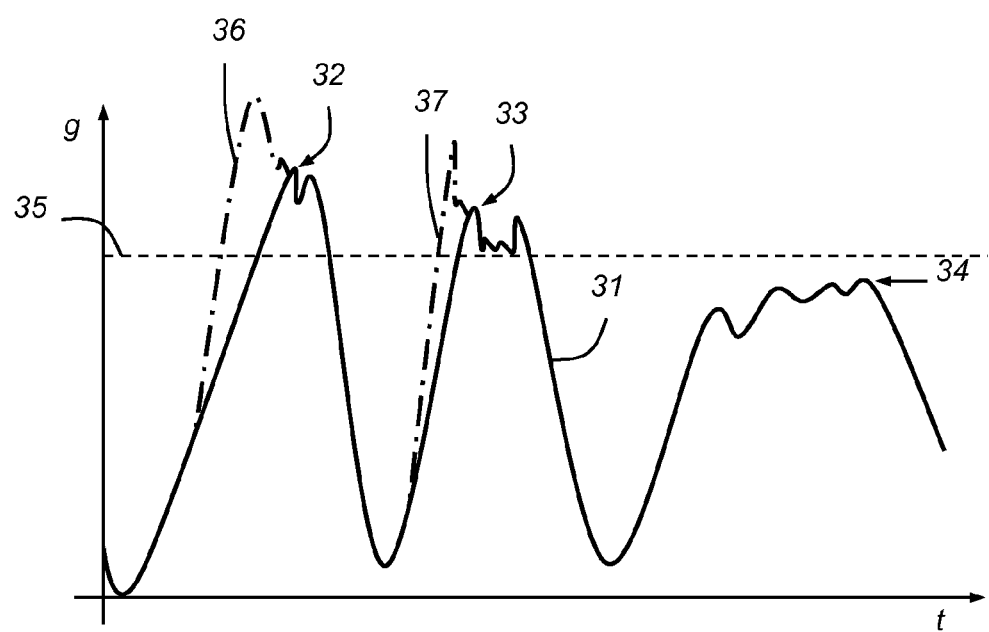
FIG. 5 illustrates graphically the effect of embodiments of the invention.

FIG. 5 illustrates the effect of a boosted lateral acceleration signal (17, 23) according to the invention. Solid line (31) represents lateral acceleration (g) during three successive corners of diminishing severity, over time t. Accordingly the peak lateral accelerations (32, 33, 34) diminish. According to a predetermined threshold (35) the initial corners may be characterized as high category, whilst the final corner may be characterized as of low category. An additional threshold may be introduced to distinguish corners of medium category.

The lateral acceleration signal may be advanced by boosting the signal, as indicated by chain-dot lines (36, 37) so as to peak much earlier than real-time lateral acceleration as measured on the vehicle, and thereby be used to compensate for inherent delay in the response of the vehicle to real-time inputs to the steering wheel by the driver.

Typically a predicted high category corner will allow deployment of an active aerodynamic device, such as an aerofoil as early as possible, ensuring the full potential benefit of the aerodynamic device may be realised, optimising vehicle performance and stability.

The invention also permits releasing or stowing of such an active device when the category of a cornering event changes to indicate a different ranking Thus the active device(s) are deployed appropriately. In the case of aerodynamic devices, vehicle drag may be improved when such devices are stowed as soon as they are not providing a net benefit to vehicle performance in the deployed condition.

A prediction of a high category corner allows early actuation of an occupant restraint, such as an active seat belt tensioner or seat side bolster, so as to better support the occupant(s) during a journey, improving occupant comfort and thus perceived quality.

Other advantages will be apparent to one skilled in the art and the present examples and embodiments are to be considered illustrative and not restrictive. The invention is not to be limited to the details given herein, but may be modified within the scope and equivalence of the appended claims.

The invention claimed is:

1. A method of triggering an active device of a vehicle comprising:
   generating a steering signal from a steering angle and a rate of change of steering angle of the vehicle, said signal representing an advance in time in comparison to said steering angle;
   determining a conditioned vehicle lateral acceleration in dependence on said steering signal and a measured vehicle lateral acceleration, said conditioned vehicle lateral acceleration being advanced in time in comparison with said measured vehicle lateral acceleration; and
   triggering an active device of the vehicle if said conditioned vehicle lateral acceleration exceeds a threshold lateral acceleration.

2. The method of claim 1, wherein steering angle is represented by an angular departure from a reference position.

3. The method of claim 2, wherein the reference position is straight ahead.

4. The method of claim 2, further comprising the step of applying a minimum level to one or more of the steering angle, the rate of change of steering angle, vehicle speed, or lateral acceleration, below which an instance of the method is terminated.

5. The method of claim 1, wherein said steering signal is determined from a look-up table.

6. The method of claim 1, wherein said steering signal is determined from an algorithm linking steering angle and rate of change of steering angle.

7. The method of claim 1, and including the steps of:
   determining a modified vehicle lateral acceleration by reference to vehicle speed, and
   determining said conditioned vehicle lateral acceleration by reference to said modified vehicle lateral acceleration.

8. The method of claim 1, wherein the method is implemented by using an electronic control module of a vehicle.

9. The method of claim 1, wherein the active device comprises one or more of:
   a seat belt tensioner,
   an active seat bolster, and
   a deployable aerodynamic device.

10. The method of claim 1, comprising determining steering angle from an electronic signal of steering wheel angle.

11. The method of claim 10, comprising determining rate of change of steering angle from an electronic signal of steering wheel angle and an electronic clock signal.

12. A system for a vehicle comprising an electronic control unit (ECU) and one or more sensors in communication with the ECU, wherein the ECU and the one or more sensors generate a steering signal from a steering angle and a rate change of steering angle of the vehicle, said signal representing an advance in time in comparison to said steering angle; determine a conditioned vehicle lateral acceleration in dependence on said steering signal and a measured vehicle lateral acceleration, said conditioned vehicle lateral acceleration being advanced in time in comparison with said measured vehicle lateral acceleration ;and trigger an active device of the vehicle if said conditiond vehicle lateral acceleration exceeds a threshold lateral acceleration.

13. A vehicle having a system as claimed in claim 12.

* * * * *